Figure 1:
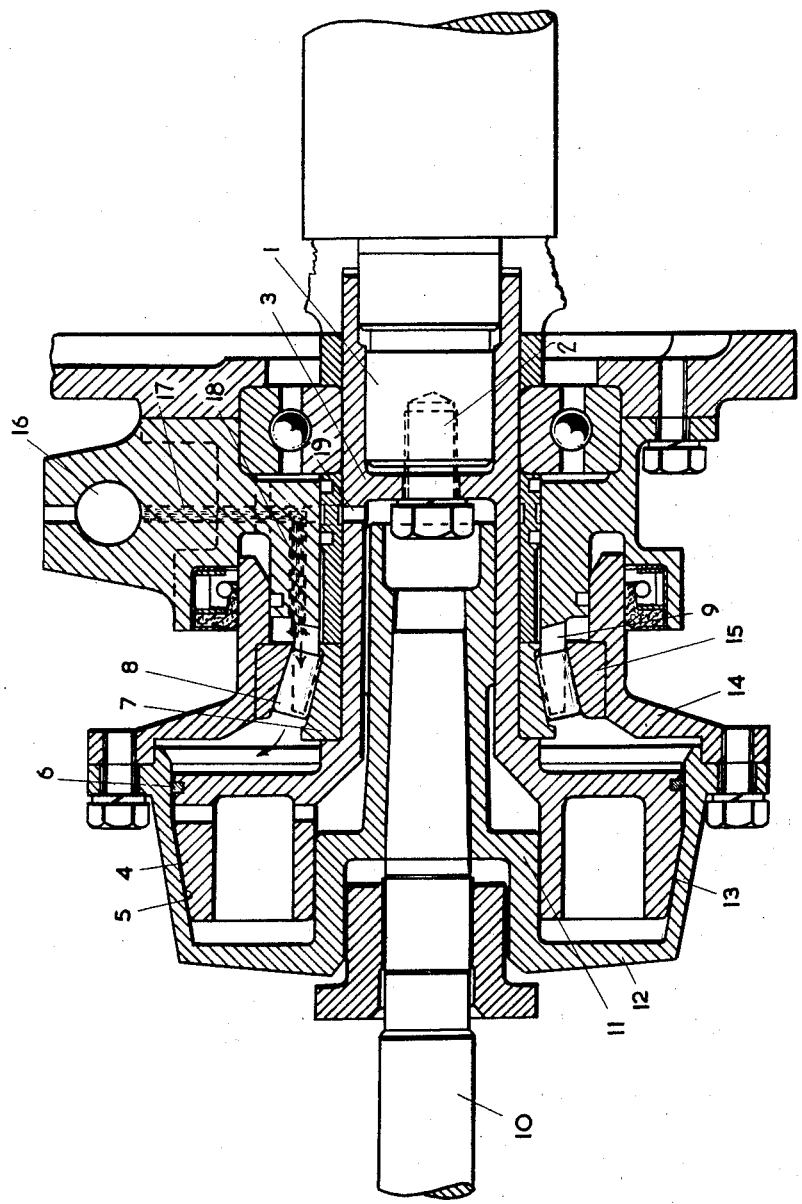

Nov. 10, 1959  A. M. G. PEACE  2,911,839
MARINE REVERSE GEAR MECHANISM
Filed March 11, 1958  2 Sheets-Sheet 1

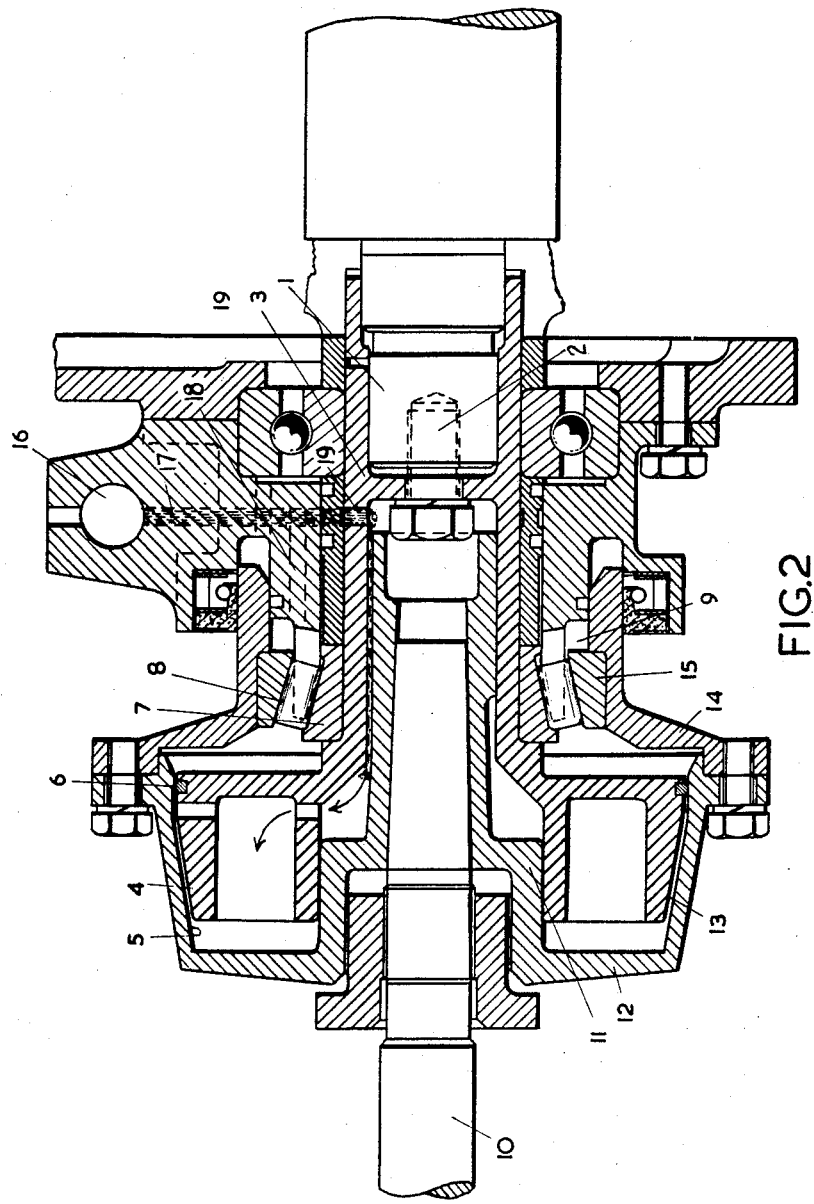

United States Patent Office 2,911,839
Patented Nov. 10, 1959

2,911,839

MARINE REVERSE GEAR MECHANISM

Archibald M. G. Peace, Belton, England

Application March 11, 1958, Serial No. 720,671

5 Claims. (Cl. 74—205)

This invention is concerned with reverse gear mechanism suitable for use with marine engines.

For high powered boats a reverse drive is usually only required for occasional use and partial power astern, for example when manoeuvring in confined areas. Also, particularly in the smaller craft, usually only a relatively small space is available for any reversing mechanism.

It has already been proposed to use epicyclic gearing whereby, by varying the engagement of the planet wheels with the sun wheel and annulus a direct and reverse drive can be transmitted. The use of ball or tapered rollers as the planet wheels operating in inner and outer races as the sun wheel and annulus in such a system has also been proposed.

It is an object of the present invention to provide an improved reverse gear mechanism which is compact and relatively inexpensive to manufacture and which can be silent in operation and self-adjusting to take up wear.

It is also an object of the invention to provide a reverse gear mechanism which incorporates tapered rollers in such a way that there is a slight reduction ratio between the forward and astern speeds whereby stalling the engine when reverse gear is engaged is avoided.

The accompanying diagrammatic drawings illustrate one embodiment of the invention which achieves these objects. Figure 1 shows a sectional view of a reverse gear mechanism in the direct drive position, while Figure 2 shows a similar view of the same mechanism in the reverse drive position. In these drawings a driving shaft 1 which is itself driven by an engine, not shown, is clamped by means of bolt 2 and keyed to a transmission member 3 provided with a conical drum 4 having a frictional clutch surface 5 and a piston ring seal 6. The member 3 also carries a circular bearing race 7 in which tapered rollers 8 are located. A fixed cage 9 prevents any circumferential displacement of the said rollers, and rollers 8 together with cage 9 form a reversing roller means, as is apparent from the description below. A driven shaft 10, suitably journalled, carries the propeller, not shown, and a second transmission member 11, which is provided with a conical drum 12 having a frictional clutch surface 13 adapted to enter into direct engagement with the other clutch surface 5. The drum 12 is rigidly connected to a wheel 14 which carries the outer bearing race 15. Oil is supplied under pressure via the channels 16, 17, 18 and 19 to the various parts of the mechanism.

In operation the mechanism works as follows: For direct drive, i.e. when the boat is to be driven forward the shaft 1 is rotated in a clockwise direction and conveys the rotary motion through the members 3 and 4, the clutch surfaces 5 and 13, and the members 11 and 12 to the propeller shaft 10. Oil supplied via channels 16, 17 and 18 enters the space between members 4 and 14 and forces the clutch surfaces 5 and 13 into engagement with each other. The rollers 8 rotate freely without transmitting any appreciable force, between the races 7 and 15. For reverse drive a valve, not shown, is operated to cut off the supply of oil along channel 18 and to allow it to flow via channel 19 into the space between members 3 and 11 and thence to the space between members 4 and 12. This forces the whole mechanism 10, 11, 12, 13, 14 and 15 away from the mechanism 3, 4, 5, 6, and 7, thus disengaging the clutch surfaces 5 and 13 and by virtue of the relative positions of bearing races 7 and 15 bringing them closer together, thereby bringing them into heavy frictional contact with the rollers 8. The rollers being prevented from circumferential displacement by cage 9 of the reversing roller means 8, 9, the clockwise motion of the race 7 on the member 3 now rotates the rollers 8 in an anticlockwise direction and they in turn rotate outer race 15 and so through members 14, 12, 11, the propeller shaft 10 in an anti-clockwise direction.

Suitable oil draining grooves and channels, not shown, are provided as necessary for the draining away of the oil not required when the direction of motion is changed.

It will be seen how in the forward drive position the propeller thrust assists in maintaining the clutch faces in engagement and in the reverse drive position the propeller thrust in the opposite direction assists in disengaging the clutch and jamming the rollers.

The invention is not limited to this specific embodiment but includes any reverse gear mechanism in which there is a driving shaft capable of being rotated by direct drive from an engine and a drive transmission member keyed to the said shaft and having a clutch surface and an inner bearing race, and a driven shaft carrying a second drive transmission member keyable to a propeller shaft and having a second clutch surface positioned and adapted to engage with the driving shaft clutch surface and also having an outer bearing race, and tapered rollers located between the inner and outer bearing races, and forming with them an epicyclic gear system, which rollers are prevented from circumferential displacement by a fixed cage, wherein one or both of the two drive transmission members are movable axially relative to each other and means are provided for effecting the said relative axial movement between the two members, whereby in one postion the clutch surfaces of the two transmission members are engaged, while the bearing rollers are disengaged from the outer race, thereby providing a direct drive between the driving shaft and the driven shaft, while in the other position the said clutch surfaces are disengaged but the bearing rollers are jammed to provide the necessary friction between themselves and the inner and outer races, whereby the driven shaft is rotated in the reverse direction from the driving shaft.

The driving shaft, the driven shaft, the transmission members, the clutch and the epicyclic gear system of inner and outer races and tapered rollers are of any suitable conventional type and are of dimensions and strength suitable for the particular purpose in view.

The cage which prevents the circumferential movement of the rollers while allowing them to rotate freely is also of any suitable type. It is fixed from rotation by keyed attachment to a non-moving part of the mechanism.

The means for providing the relative axial movement between the two drive transmission members may be hydraulic or mechanical. The axial movement must be sufficient to cause the necessary engagement and disengagement of the clutch and jamming and freeing of the conical rollers.

The jamming forces necessary to produce the friction required to transmit the drive may be varied by modifying the cone angle of the tapered rollers. The propeller thrust in reverse will also incearse the frictional force between the rollers and races and so assist in providing the necessary friction in the bearing.

A neutral position of the mechanism is also provided wherein neither are the clutch surfaces engaged nor are the bearing rollers jammed.

In a preferred embodiment oil under pressure is used to provide the desired relative axial movement between the two drive transmission members. The oil control valve which releases oil under pressure as desired, either to move the mechanism into the forward drive or reverse drive position, is of any suitable conventional type. Grooves and channels for the supply and draining of the oil are provided in the several parts of the mechanism whereby when a direct drive is required the oil pressure acts to keep the clutch surfaces engaged and the parts of the roller bearings disengaged and when reverse drive is required it acts to keep the clutch surfaces disengaged and the rollers in frictional contact with the inner and outer races. In this embodiment the neutral position is obtained by cutting off the supply of oil to both sides of the actuating mechanism.

The reverse gear mechanism as described above, illustrated in the drawings and claimed in the claims of this specification, has the advantages of compactness and relatively low cost of manufacture over known mechanism. If, as in the preferred embodiment, it is oil operated, it has the added advantage of being self-adjusting to take up wear. Furthermore, owing to the use of tapered rollers, there is a slight reduction ratio between the forward and astern speeds whereby stalling the engine when reverse gear is engaged is avoided.

I claim:

1. In a reversible transmission, in combination, outer clutch means forming a hollow housing and inner clutch means coaxially housed within said outer clutch means, at least one of said clutch means being axially movable with respect to the other between an engaged position where said outer and inner clutch means engage each other for transmitting a drive therebetween and a disengaged position where said outer and inner clutch means are out of engagement so that no drive will be transmitted therebetween, said inner clutch means forming in said outer clutch means a pair of chambers respectively located on opposite sides of said inner clutch means and fluid-tightly seperated from each other so that when fluid under pressure is admitted to one of said chambers said one clutch means will be located in said engaged position while when fluid under pressure is admitted to the other of said chambers said one clutch means will be located in said disengaged position; a pair of annular race means coaxial with and respectively fixed to said outer and inner clutch means so that the race means fixed to said one clutch means will move axially therewith, said pair of race means being nearer to each other when said one clutch means is in said disengaged position than when said one clutch means is in said engaged position thereof; reversing roller means located between and pressing against said pair of race means when said one clutch means is in said disengaged position thereof for reversing the transmission, the distance between said pair of race means when said one clutch means is in said engaged position thereof being great enough to prevent transmission of the drive through said roller means and pair of race means; and means communicating with said chambers for directing fluid under pressure thereto.

2. In a reversible transmission as recited in claim 1, the race means which is fixed to said outer clutch means surrounding the other race means and said pair of race means and roller means cooperating to subject said pair of race means to predominately radial stresses when said one clutch means is in said disengaged position thereof.

3. In a reversible transmission is recited in claim 1, said pair of race means and roller means being located in said outer clutch means.

4. In a reversible transmission as recited in claim 3, said pair of race means and roller means being located in said one chamber of said outer clutch means so that when the fluid under pressure is oil it will lubricate said pair of race means and roller means when said one clutch means is in said engaged postion thereof for reducing any friction losses at said pair of race means and roller means when said one clutch means is in said engaged position thereof.

5. In a reversible transmission as recited in claim 1, said outer and inner clutch means respectively having annular surfaces which engage each other when said one clutch means is in said engaged position thereof and said annular surfaces being of a substantially larger diameter than said pair of race means.

References Cited in the file of this patent

UNITED STATES PATENTS

| | | |
|---|---|---|
| 692,754 | Alsop | Feb. 4, 1902 |
| 1,208,438 | Aarno | Dec. 12, 1916 |
| 2,593,170 | Morse | Apr. 15, 1952 |